Dec. 30, 1941.  T. ZUSCHLAG  2,267,884
VARIABLE FEEDBACK SYSTEM
Filed Oct. 25, 1939  3 Sheets-Sheet 1
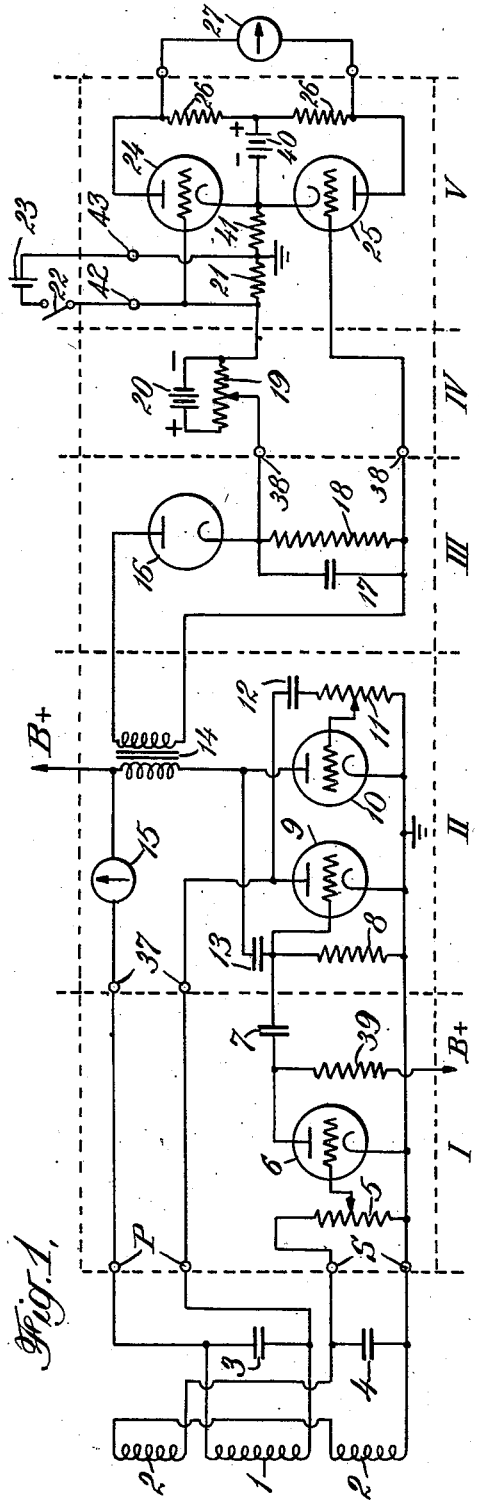
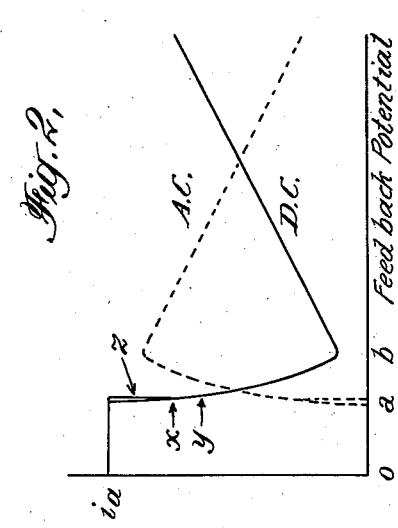
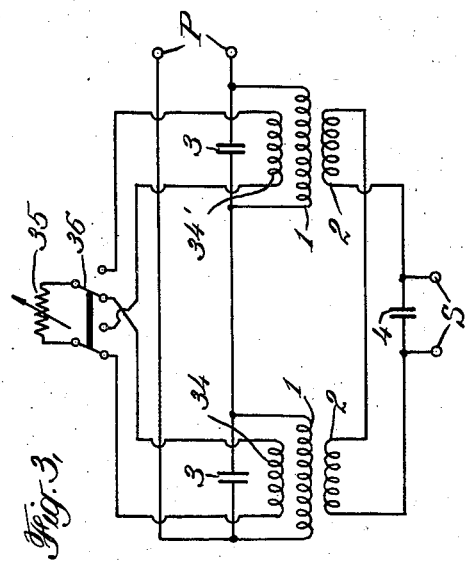
INVENTOR
*Theodor Zuschlag*
BY
*Pennie, Davis, Marvin and Edmonds*
ATTORNEYS Dec. 30, 1941. T. ZUSCHLAG 2,267,884
VARIABLE FEEDBACK SYSTEM
Filed Oct. 25, 1939 3 Sheets-Sheet 2

INVENTOR
Theodor Zuschlag
BY
Pennie, Davis, Marvin and Edmonds.
ATTORNEYS

Dec. 30, 1941.  T. ZUSCHLAG  2,267,884
VARIABLE FEEDBACK SYSTEM
Filed Oct. 25, 1939  3 Sheets-Sheet 3

INVENTOR
Theodor Zuschlag
BY
Pennie, Davis, Marvin and Edmonds.
ATTORNEYS

Patented Dec. 30, 1941

2,267,884

UNITED STATES PATENT OFFICE 2,267,884

VARIABLE FEEDBACK SYSTEM

Theodor Zuschlag, West Englewood, N. J., assignor to Magnetic Analysis Corporation, Long Island City, N. Y., a corporation of New York Application October 25, 1939, Serial No. 301,179

33 Claims. (Cl. 175—183)

This invention relates to the art of electrical measurements and especially to a novel variable feedback oscillator system for use in connection therewith.

Although the oscillator system herein contemplated is applicable to various types of electrical measurements, it is especially useful in connection with the measurement or testing of conductive materials in respect to analysis, heat treatment, structure, and the existence of variations or defects. Consequently, the following specification will treat largely of apparatus adapted to measurements and tests of that character.

In general, the invention in its preferred form contemplates the use of an oscillator system having primary and secondary feedback circuits so related to the material under test that variations in the observed characteristics of the material influence either the primary feedback, the secondary feedback, or both, with the result that an extremely sensitive measurement may be achieved. In the event that a lower degree of sensitivity is sufficient the system may be simplified to include only the primary feedback.

Heretofore attempts have been made to utilize oscillator circuits for testing purposes, but few of these have been successful, at least for testing electrically conductive material or metals, because in crder to be commercially reliable and not unduly critical the circuits were designed for a considerable degree of stability, and hence were not sufficiently sensitive to measure or indicate minute variations in the characteristics of the material under observation. On the other hand, the oscillating system in accordance with the present invention may be adjusted for complete stability and reliability while at the same time exhibiting sensitivity in response of a new order of magnitude.

In brief, the system of my invention in its preferred form includes a vacuum tube oscillator and a vacuum tube amplifier, the amplifier serving as a coupling to feed back to the oscillator just enough power to maintain oscillations. This primary fedeback circuit includes, by inductive relation, the material under test or measurement. A secondary feedback circuit, likewise including the material under test, couples the primary oscillator system through a vacuum tube amplifier to the input of the primary oscillator, which results in extreme sensitivity of the oscillator system as a whole to minute variations in the material under test.

The invention will best be understood by a description in connection with the drawings, wherein:

Fig. 1 is a circuit diagram of a feedback oscillator and test system in accordance with a preferred form of the present invention.

Fig. 2 shows curves illustrating the operation of the feedback oscillator system;

Fig. 3 is a circuit diagram of a preferred arrangement of coupling coils for use with conductive materials;

Figure 4:
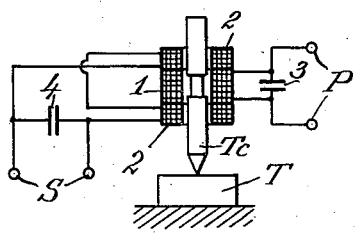
Figs. 4, 5, 6 and 7, illustrate various forms of coupling or test coils for tests or measurements under various conditions.

Referring now to Fig. 1 the circuit diagram may for convenience be divided into five sections. Sections I and II comprise the oscillator proper, section III being a rectifier, section IV a compensator, and section V an output amplifier. There are also shown suitable pickup or test coils connected to the input of the oscillator system, and a galvanometer or other suitable indicating or recording device connected to the output side of the amplifier. Section II includes the primary feedback oscillator which comprises an oscillator tube 9 coupled through a condenser 12 and adjustable potentiometer resistance 11 to the grid of an amplifying and coupling tube 10. The anode of this coupling tube is coupled through a condenser 13 and resistor 8 to the grid of oscillator tube 9, and is connected through the primary winding of output transformer 14 to the positive pole of an anode-potential source, B+. The anode circuit of tube 9 includes in series the primary terminals P to which are to be connected a suitable primary or test coil adapted to be placed in inductive relation to the material or article under test or measurement, and a milliammeter 15, which, in turn, is connected to the positive pole of the same anode-potential source. This portion of the system comprises the primary feedback oscillator. Section I is the second portion of the two oscillator sections which comprise the complete oscillator system, and includes an amplifier tube 6, the output of which is coupled by means of resistance 39 and condenser 7 to the input of oscillator tube 9 of section II. In the input to amplifier tube 6 is connected an adjustable potentiometer 5 which in turn is connected to secondary terminals S to which may be connected suitable secondary test coils, also adapted to be placed in inductive relation to the material or article under measurement.

Following the oscillator sections I and II there is shown in Fig. 1 a rectifier which is included in section III. This rectifier, here represented as a diode rectifier tube 16, is coupled to the output of the feedback oscillator through a secondary winding of coupling transformer 14. The rectified voltage from rectifier 16 is developed across a suitable resistance 18 across which a by-pass capacity 17 is connected, and this rectified potential is impressed upon a suitable direct-current amplifier through a compensator contained in section IV. This compensator includes a battery and potentiometer or other adjustable direct-current source to provide adjustable biasing potential for the subsequent amplifier. This amplifier is shown in section V, and may comprise, for example, a pair of triode vacuum tubes 24 and 25 connected in a push-pull arrangement as illustrated. A fixed bias on the grids of tubes 28 and 29 is derived from bias resistor 41. The anodes of these D. C. amplifier tubes are coupled through resistance 26, the midpoint of which is supplied with anode potential from a battery 40. The potential developed across either section of this output resistance 26 serves to actuate a suitable recording indicator or meter 27. By connecting the amplifier as shown, meter 27 will be sensitive to polarity and will fluctuate in one direction or the other depending upon the direction of flow of the current fed to the input of the direct-current amplifier. In order that the amplifier may be blocked temporarily to prevent damage to the indicating meter 27 by reason of excessive fluctuation, and to prevent the meter from responding while the system is being set up or adjusted, a biasing circuit has been provided in section V. This circuit includes a biasing battery or other suitable potential source 23 connected through a control switch 22 across a biasing resistance 21. An adaptation of this control circuit is employed in the system of Fig. 6.

As shown in Fig. 1, connected to the terminals P and S are test or pick-up coils which in practice would be placed in inductive relation to the material under test or observation. To the primary terminals P a primary coil 1, shunted by a suitable condenser 3, is connected; and to the secondary terminals S are connected a pair of similar coils 2 shunted by a suitable condenser 4. The coils 2 are preferably of identical characteristics and connected, as shown, in opposition to balance their effect on primary coil 1, in the absence of testing material, or in the presence of testing material of uniform and perfect characteristics. The condensers 3 and 4 may be adjustable to tune the primary and secondary coils to the desired oscillator or testing frequency. Different frequencies may be used in different circumstances, it having been found with the apparatus herein described that the oscillating system may be used at frequencies within the range of approximately 100 to 20,000 cycles.

To adjust the system for operative condition, the biasing cut-off switch 22 may first be closed to nullify any effect on the recording meter or indicator 27. Both the primary feedback control potentiometer 11 and the secondary feedback control potentiometer 5 are initially set at the bottom or zero positions. Then the primary feedback potentiometer 11 is moved progressively from the zero position until oscillations start, as shown on milliammeter 15. The characteristics of the oscillator circuit in section II are illustrated approximately in Fig. 2, which represents the changes in the direct and alternating anode current components as the feedback potential is increased by movement of the potentiometer 11. The full line represents the variation of the direct anode current as measured by milliammeter 15, and the dotted line represents the corresponding variations in the alternating current which would appear, for example, in the secondary of output coupling transformer 14, and which consequently may be compensated for by direct-current compensator 19—20 of section IV which will be described later. From Fig. 2 it will be noted that the direct anode current remains constant until a certain input value of feedback potential $a$ is reached. At this point oscillations start and the direct current flow drops very sharply while the alternating current component appears and rises sharply. Further increase of the primary feedback decreases the direct anode current component, while the alternating anode current component increases until the two components reach, respectively, minimum and maximum values for a certain input coupling corresponding to potential $b$. A still further increase of the input coupling then produces a steady increase in the direct-current component and similarly a steady decrease in the alternating current component. As is illustrated, the greatest change in the two plate current components occurs just after the system starts to oscillate; and it is within this region that it is preferable to operate the primary feedback control, especially, if the secondary feedback of section I is not employed.

Assuming for example, that the primary feedback control 11 has been advanced just far enough to start oscillations then such oscillations can be stopped immediately by passing a metallic conductor through or near primary coil 1. In order to restart oscillations the feedback control must be advanced an amount which depends upon the magnetic and electric constants of the material inductively related to the primary coil as well as its geometrical dimensions.

To obtain the greatest sensitivity of the oscillating system included in section II (regardless of whether or not the secondary feedback of section I is employed in addition) the adjustment may proceed as follows: As the material under test is inserted in or close to the primary coil 1 and the primary feedback control 11 is gradually advanced from its zero position until oscillations start, as indicated by a sudden decrease in the anode current milliammeter 15, then control 11 is slightly backed up which results in a slight increase in anode current until a value just short of the non-oscillating anode current flow is obtained. This would be in the region $z$ indicated on the D. C. curve of Fig. 2. At this point extremely small changes in coupling produce the biggest anode current changes, thereby making the system most sensitive for testing purposes.

It will be clear that slight changes in the constants of the material under test may mean a definite change in the losses which affect the primary feedback required to establish oscillations. Changes in losses on the other hand may be considered identical with changes in coupling to the oscillator tube 9 which, therefore, must result in fluctuations of the direct and alternating anode current components. For example it is quite possible that an increase in the diameter of the material passing through or near the primary coil may stop the oscillations, while a decrease in diameter may intensify them. When employing a system as in Fig. 1 with primary and secondary feedback coils a uniform defect in the material under test will cause a reaction in the primary feedback circuit, but not in the secondary feedback circuit; whereas such a defect will cause a reaction in both the primary and secondary feedback circuits of Fig. 3. Non-uniform defects will cause reactions in both primary and secondary feedback circuits of a'l the illustrated arrangements.

The alternating anode current component in the oscillator of section II is coupled through transformer 14 to the rectifier in section III, and as previously mentioned, the resulting direct-current output from the rectifier is preferably balanced out by a direct-current compensator 19—20. This compensation is indicated by the zero reading of the galvonometer 27, and is made after the oscillator of section II has started to oscillate and before an off-standard material has been placed within the test coil 1. The rectified a'ternating anode current component from the oscillator usually amounts to several volts, and this voltage although steady, if applied to the meter or indicator 27, would interfere with the reading and with the sensitivity. Therefore, by adjusting potentiometer 19 so as to insert in series with the potential output from rectifier 16 an equal and opposite potential, the steady output potential from the oscillator wi'l be compensated for. Before making this compensating adjustment the cut-off biasing switch 22 should, of course, be opened. After the foregoing adjustments have been made, the meter or indicator 27 will indicate the presence of variations in the material under test which is placed in or near the test coil 1.

As previously stated, greatly increased sensitivity of the system as a whole and improved stability and reliability results from the addition of secondary feedback to the osci'lating system, by the addition of the components and connections shown in section I of Fig. 1 together with the secondary test coils connected thereto. Because of the greatly increased sensitivity thus introduced it is no longer necessary that the oscillator of section II be operated in the region z shown on the curve of Fig. 2. As a matter of fact, when the secondary feedback is employed, the oscillator of section II may be operated below point x on the curve such, for example, as at point y. At point y the oscillator is quite stable, so that variations in the materials under test, even though they be of considerable magnitude, are not likely to cause a stopping of the oscillations. Obviously this is a decided advantage because once the oscillations stop the apparatus must be momentarily put out of service and readjusted.

When the two portions of the secondary test coil 2 are electrically identical with each other and are symmetrically disposed with regard to the primary coil 1, the output of the two secondary coils and the input to the feedback amplifier section II is zero as long as the material passing by the primary and secondaries is of a uniform quality and cross-section, i. e., is free from variations. This being the case, increasing the input to the feedback amplifier 6 does not affect the oscillations of the oscillator of section II. On the other hand, if the material passing by the three coils changes or varies in any respect, then the changes induced in the secondaries 2 do not neutralize each other, and cause a change in voltage on the grid of secondary feedback amplifier 6, which in turn causes an amplified voltage to be impressed on the grid of the oscillator tube 9 which results in a pronounced fluctuation of the direct current and alternating current components of the oscillator of section II. The direct-current fluctuations in turn affect the voltage induced in the secondaries 2, thereby causing a still further variation in the oscillator output. The intensity of the oscillations may be increased (positive) or decreased (negative) depending upon the polarity of the secondary coil connections. A negative secondary feedback usually yields more sensitivity than a positive secondary feedback; and it is usually preferable that this negative feedback be only moderate; because excessive negative feedback may stop the oscillations. To determine that the test coils are connected to provide a negative secondary feedback, it may be observed that a negative feedback is indicated if, as the potential applied to amplifier tube 6 is raised by adjustment of potentiometer 5, the ammeter 15 shows increased current. In practice it is usually preferable to reduce the residual coupling between the primary and secondary coils 1 and 2 to a value as low as feasible in order to enable as great amplification as possible in section I.

Whereas the oscillator system of section II using a primary coil 1 alone, and without secondary coils 2 and without the amplifier of section I, is much more sensitive to small defects than were previously known systems, the addition of the secondary feedback of section I and secondary coil 2 provides enormously greater sensitivity. This preferable system is especially valuable in connection with the testing of non-magnetic materials. Obviously, the current variations appearing in the output of the oscillator as, for example, at transformer 14, may be treated as the circumstances require. For example, the alternating current from transformer 14 might be amplified before it is rectified, or a different form of rectification, and a different form of direct-current amplifier following rectification may be employed depending upon the use to which the apparatus is to be put. Although the apparatus described in connection with Fig. 1 has proved to be eminently satisfactory for certain testing and measuring purposes to which it has been applied, it is obvious that various modifications within the ordinary skill of workers in this art might be desirable in connection with different specific applications.

A large variety of forms of test coils suitable in connection with the use of the present invention may be employed depending largely upon the materials under test and the nature of the variations which it is desired to observe. In selecting a suitable coil arrangement it should be kept in mind that in connection with previously known equipment for similar testing purposes a substantially uniform alternating current excitation was customarily employed, whereas in connection with the present invention a widely varying alternating current excitation is used. The fact should also be kept in mind that any circuits which permit of complete or partial compensation of secondary voltages, as is fundamentally shown in the test coil arrangement of Fig. 1, are likely to be suitable in connection with the secondary feedback described herein.

Referring now to Fig. 3, two separate tuned primary coils 1 are shown to be connected in opposition. In addition, each primary coil system is equipped with a third coil individually connectable to a shunt resistance 35, by means of double-pull, double-throw switch 36. This arrangement makes it possible to compensate either completely or partially the losses caused by the introduction of conductive materials in either of the coil systems. If magnetic material be tested, the switch should connect the resistance 35 to whichever coil 34 is inductively related to the material, whereas in the case of non-magnetic material the resistance should be connected to the third coil which is not in inductive relation to the material. This system is discussed further in connection with Fig. 6.

Figure 5:
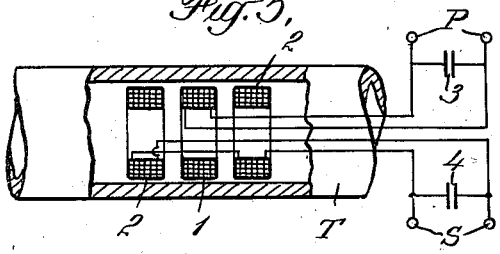
Figure 7:
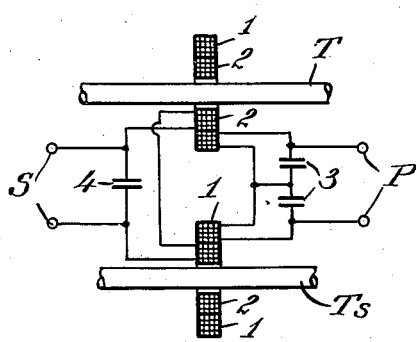
Figure 6:
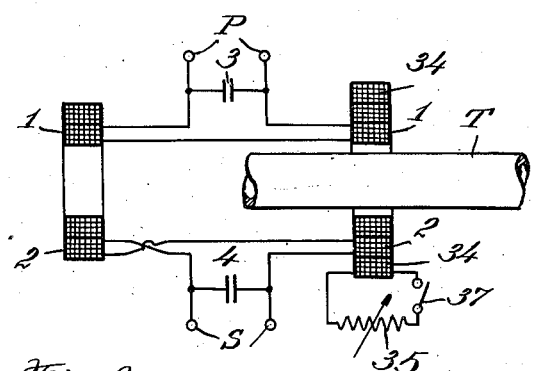
Figure 8:
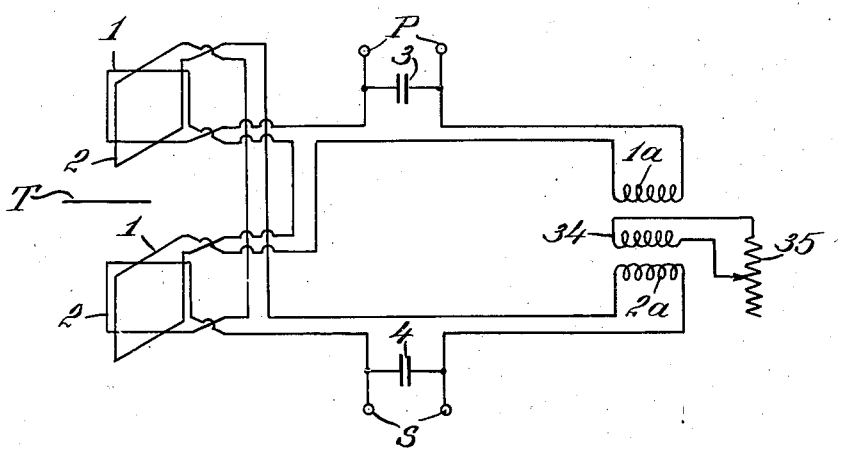
Fig. 8 is a diagram showing two sets of test coils, certain coils in each set being respectively at right angles to each other.

Figs. 4–8, inclusive, illustrate several practical examples of coil systems applied to particular measuring problems. Figs. 4 and 5 illustrate forms of coils which follow the scheme shown in the coil system of Fig. 1, whereas Figs. 6, 7 and 8 show forms following the coil arrangement of Fig. 3.

Fig. 4 illustrates a primary coil 1 and a secondary coil 2, the latter being divided into two portions connected in opposition. All three coils are arranged to surround the core piece $T_c$ of conducting material of relatively short length. This core piece, of conductive material having a center section of different and preferably reduced diameter, might be of magnetic material, and is arranged with a suitable point or surface which may ride, for example, on the material T under test. Thus variations in thickness of the material T would cause the piece $T_c$ to rise or fall thus influencing the oscillator circuit in the manner previously described. From this it is clear that although in the arrangement of Fig. 4 the material actually under test does not pass through the test coil system, the operation of the device is equivalent in all respects to an arrangement in which the material does pass through the test coils. In practice, the arrangement of Fig. 4 might be employed as follows: First the core piece $T_c$ is placed upon a standard specimen T and is symmetrically disposed within the primary coil 1. Both feedback adjustments 11 and 5 (of Fig. 1) are set at zero, and then the oscillator is started by a suitable adjustment of the primary feedback control 11, as indicated on oscillation-indicator 15. The indicating galvanometer 27 is then balanced by means of potentiometer 19, after which secondary feedback is applied by adjustment of potentiometer 5, and the primary-secondary coil combination of Fig. 4 is vertically adjusted until the galvanometer balance is reestablished. The blocking switch 22 is then closed while the standard test specimen is replaced by a test specimen of unknown deflection; and after opening switch 22 the galvanometer deflection noted. Obviously, if the dimensions are identical the galvanometer will continue to show zero indication, but if the dimension of the unknown test piece is different from the standard the core piece $T_c$ will assume a different vertical position and a proportional deflection of galvanometer 27 will result.

Fig. 5 also shows a combination of a single primary 1 and two opposed secondary coil sections 2, respectively. In this arrangement the coils are dimensioned so that they may be passed through the inside of tubular material in order to inspect such tubing for the existence of inside cracks or seams. In both Figs. 4 and 5 the axes of the coils coincide electrically with the axis of the material under test, i. e., the axis of the material of which variations are to be indicated.

Fig. 6 illustrates an arrangement for the outside inspection of uniformly dimensioned material such as bar stock or tubing, for example, and may comprise two identical primary and secondary coil systems, one of which is equipped with an additional or third coil shunted by an adjustable resistance, as in Fig. 3. If the material to be inspected is magnetic then the test specimens are passed through the coil combination containing the third coil, whereas non-magnetic material would be passed through the coil combination which does not include the third coil. In the illustration, the test material is shown inside the coil combination of the first-named arrangement. In either case the test procedure to be followed is the same: With a standard specimen inserted, the secondary feedback control 5 (Fig. 1) is set to zero and oscillations started by means of the primary feedback control 11. The output galvanometer 27 is then placed at zero indication by adjustment of compensator 19, and the secondary feedback is increased by potentiometer 5 until a decided deflection of milliammeter 15 is obtained. Shunt resistance 35 (Fig. 6) is then adjusted until the original reading of the milliammeter, as well as the balance of the meter 27 is reestablished. It may be noted here that when this loss coil 34 is employed there is no longer required complete compensation between secondary coils 2 such as normally is considered a prerequisite for sensitive measuring combinations. In the event that the test specimen T is of non-magnetic material it would be inserted in the coil combination which does not include the third coil 34, in which case resistance 35 would be adjusted to balance the meter as described above. The different treatment of magnetic and non-magnetic material may be explained by the fact that for magnetic material the gain in field strength due to increased permeability is greater than the losses caused by eddy currents—at least for lower frequencies—and therefore the gain is to be reduced by the losses set up in the third coil in order to reestablish an approximate secondary compensation. On the other hand in the case of non-magnetic material only equivalent eddy current losses are present because there is no gain in field strength due to different permeability. In the coil arrangement of this figure, the primary and secondary coils shown at the left are required only for electrical balancing, and so need not be dimensioned to allow for the insertion of the material under test. This fact is true also of the system of Fig. 3. Like Fig. 3 the coil system of Fig. 6 may include a third coil on each side, and the resistance 35 be connected to a switch allowing its connection to either third coil at will. In that even the resistance 34 would be connected to that third coil which is not in inductive relation to the material under test, provided it is non-magnetic material, and the resistance would be adjusted to balance the effect of the eddy current losses in the material before the actual tests are run. One or more loss-balancing coils as in Figs. 3 and 6 may of course be added to any of the other coil systems herein referred to. Instead of using the third coil arrangement for balancing the effect of magnetic material as shown in Fig. 6, it is also possible to vary the frequency of the oscillations by changing the values of the tuning condensers 3 and 4 until a frequency is reached at which the eddy current losses just equal and compensate for the increase in field strength due to permeability.

Another modification of the coil arrangement of Fig. 3 is illustrated in Fig. 7, wherein two identical primary and two identical secondary coils are shown, arranged so that a standard test sample may be compared with an unknown test sample by electrically balancing the one against the other. Such an arrangement of coils is also useful in testing two specimens which are non-uniform yet are symmetrically dimensioned. In this case the two specimens are passed simultaneously and at the same rate through the two coil systems so that identical sections of the two specimens are exposed to their respective coils at the same time. Such an arrangement may be advantageous for inspecting tapering material such as golf club shafts, and the like. In order to increase the sensitivity of this combination it is possible in this instance to use individual tuning for the two primary coils, without changing the procedure of testing outlined before, two condensers, 3, for this purpose being illustrated in the figure.

The difficulties of inspecting, accurately, thin metal sheets and especially metal foil are well known; first, metal of thin cross section does not produce much effect on previously known testing systems because they are not sufficiently sensitive, and second, because during the passage of the foil between pickup coils the foil is likely to wave and vary the distance between the foil and the respective coils. The system of the present invention when employed with the pickup coil as illustrated in Fig. 8 is very satisfactory, and has proven extremely sensitive to small variations in thickness or other types of defects in metallic foil. Losses caused by the eddy currents in the metal foil change the coupling between the primary and secondary test coils which are located on opposite sides of the foil. The test coils are connected in opposition with the compensating coil system shown at the right of the diagram, Fig. 8. In this coil arrangement the axes of the various test coils are parallel to the surface of the foil. This arrangement has the advantage that slight variations in the position of the foil with regard to the primary and secondary coils 1 and 2 have less effect than variations in foil thickness. This condition is greatly improved by using two coil groups so arranged that primary and secondary coils are located at both sides of the foil so that coils on the same side of the foil do not affect each other inductively. To this end the primary coil 1 which is located at the upper side of the coil, for example, is inductively coupled to the secondary coil 2 at the lower side of the foil but is not inductively coupled with the secondary coil 2 on the upper side of the foil. Similarly the primary coil 1 located on the underside of the foil is inductively coupled to the secondary coil 2 on the upper side of the foil but is not inductively coupled with the secondary coil on the under side of the foil. This arrangement is diagrammatically illustrated in Fig. 8 where the coils are drawn in rectangular form for simplicity of illustration, although they would not necessarily be actually of rectangular shape. If the apparatus is to be used to inspect or test the variations in thickness of foil of non-magnetic material, then a compensation coil 34 connected to a shunt resistance 35 may be inductively coupled to auxiliary primary and secondary coils 1a and 2a for the purpose described in connection with Fig. 6. In Fig. 8, as well as in all of Figs. 3–7, inclusive, it is understood that the connection points marked P and S are to be connected at the points correspondingly marked in the system of Fig. 1.

Figure 9:
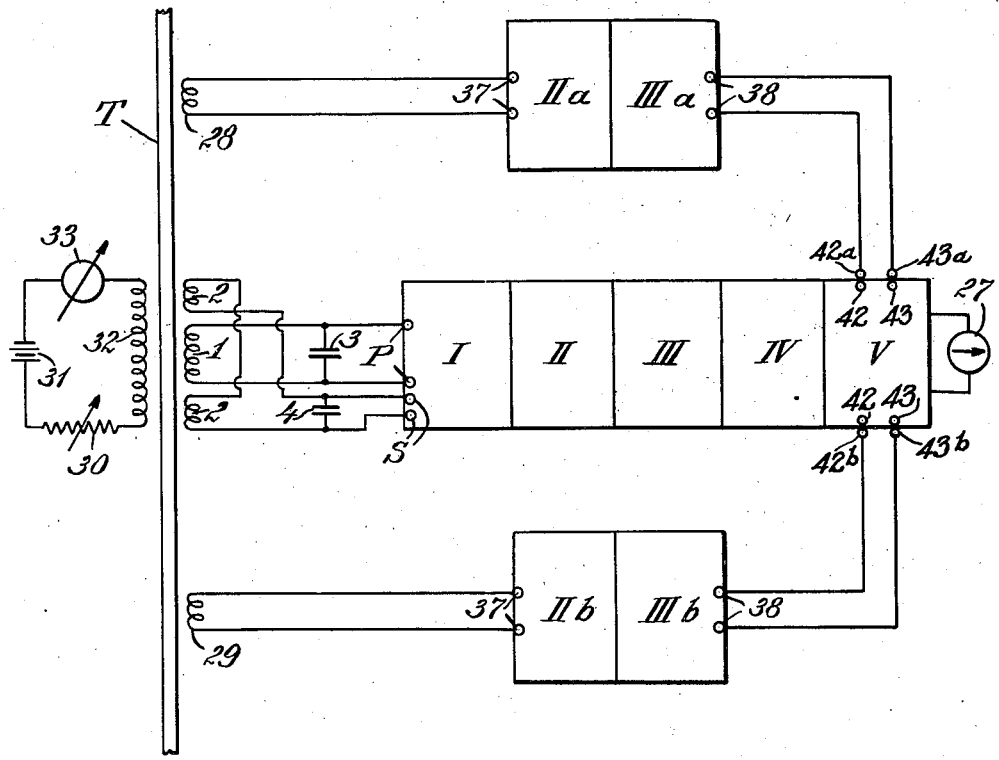
Fig. 9 illustrates a complete system employing the arrangement of Fig. 1, together with certain auxiliary controls applicable to the testing of magnetizable material, for example.

One of the most important properties encountered in the testing of ferrous material is the permeability of the object or specimen under observation. In order to obtain the most comprehensive information it frequently is advantageous to carry out tests on different values of permeability. An arrangement providing for such observations is shown in Fig. 9 where the test coil system of Fig. 1 is, preferably, symmetrically surrounded by an energizing coil 32 connected in series with an ammeter 33, a rheostat 30, and a direct-current source 31. This is sometimes called a saturation circuit and is fundamentally similar to that described in Austrian Patent No. 98,935, published December 27, 1924. Such a saturation circuit may usefully be employed in the inspection of various materials of different degrees of permeability, including inspections requiring complete saturation for the purpose of suppressing, as much as possible, the effects on the testing system of permeability variations. Such a saturation circuit with its coil may readily be combined with any of the coil systems hereinbefore described. Especially because of the extreme sensitivity of the testing system employing secondary feedback such as herein described, it is frequently necessary to saturate all magnetic materials with a suitable direct-current field in order that minute variations or imperfections in the material under test may be detected and indicated. It is assumed that in Fig. 9 the main test-oscillator with its sections numbered I—V, is similar to that shown in Fig. 1.

In order to avoid violent fluctuations of the galvanometer or recorder 27 whenever material under test enters or leaves the test coil combination, two control coils 28 and 29 may be provided and connected to two separate oscillators and rectifiers IIa, IIIa and IIb, IIIb. These oscillators IIa, IIb may be identical with the oscillator described as included in section II of Fig. 1, and the rectifiers IIIa and IIIb may be identical with the rectifiers included within section III of Fig. 1. In other words, the apparatus included within the Sections IIa and IIIa, and IIb and IIIb may be the same as that include between points 37 and 38 of Fig. 1. The output of each rectifier IIIa and IIIb is connected across a resistance such as 21 in the grid circuit of the D. C. amplifier, section V, in a manner similar to the connection of the grid bias cut-off control 22—23 in section V of Fig. 1. Such connection will result if points 42a and 42b and 43a and 43b of Fig. 9 are connected respectively to points 42 and 43 of Fig. 1. In that case the switch 22 should be left open so that the voltage from battery 23 is not applied across resistance 21. Hence in the arrangement of Fig. 9 whenever the output of the rectifier IIIa or IIIb is of sufficient magnitude, it supplies such a bias voltage to the grid of the D. C. amplifier section V as to block it and prevent the output from the main oscillator I—II from actuating the galvanometer or recording device 27.

Briefly the operation of this system of Fig. 9 is as follows: With no test material in or near coils 28 and 29 oscillations of oscillator I—II are maintained by suitable adjustment; the resultant rectified voltage actuates the D. C. amplifier V and causes zero deflection of galvanometer 7 provided the compensator IV has been adjusted as described in connection with Fig. 1. As soon as material T enters either of coils 28 and 29 the increase in losses stops the respective oscillator, such as IIa, which removes from direct-current amplifier IV the cut-off bias resulting from oscillations from the oscillator IIa. The galvanometer does not start to operate, however, until the second bias voltage set up by the second oscillator IIb is also removed by the passage of the material T through the second oscillator coil 29. As soon as the material leaves either of control coils 28 and 29 the reverse action occurs and the direct-current amplifier V is biased to cut-off. In this manner the main test-oscillator system I—V, with its extreme sensitivity is allowed to operate only when the test specimen is within influence of the entire test coil combination.

I claim:

1. The method of testing conductive material which includes the steps of establishing in an oscillator a primary feedback current effectively controlled by a given characteristic of the material under test, establishing a secondary feedback current from the output of said oscillator to the input of said oscillator, effectively controlling said secondary feedback by said characteristic, and actuating an indicating device in response to the output of said oscillator.

2. The method of testing conductive material which includes the steps of establishing in an oscillator a primary feedback current effectively controlled by a given characteristic of the material under test, establishing a secondary feedback current from the output of said oscillator to the input of said oscillator, effectively controlling said secondary feedback by said characteristic, amplifying said secondary feedback current, and actuating an indicating device in responsive to the output of said oscillator.

3. In a testing system including an oscillator and a coil connected therein, the method of detecting variations in material under test which includes the steps of generating an oscillating current in said coil to establish a magnetic field, subjecting said material to said field whereby to establish eddy currents in said material, inducing in a second coil a voltage related to said eddy currents, amplifying said voltage, impressing said voltage on said oscillator to modify said oscillating current, and actuating an indicator in response to the modified output of said oscillator.

4. In a system for detecting variations in material under test, including an oscillator system having a test coil and an indicating device, and a control system including a coil; the method of protecting said indicating device against excessive fluctuation which includes the steps of generating a potential in said control system when said material is not in inductive relation with said test coil, applying said potential to an element of said oscillator testing system whereby effectively to interrupt the connection to said indicating device, and subsequently suppressing the potential in said control system by means including the inductive relation between said material and said coil in the control system when said material is in inductive relation to said test coil, whereby effectively to establish the connection to said indicating device.

5. A system for testing conductive material which includes an oscillator comprising a first vacuum tube whose anode is coupled through a condenser and a resistance to the grid of a second vacuum tube, the anode of said second tube being coupled through a condenser and a resistance to the grid of said first tube, a test coil connected in the anode circuit of said first tube in series between the anode thereof and a source of anode potential and being tuned to a testing frequency, and a winding of an output transformer connected in series between the anode of said second tube and said voltage source.

6. A system according to claim 5, characterized in that one of said resistances is connected between its associated coupling condenser and the cathode of one of said tubes, an adjustable oscillation-control contact on said last named resistance being connected to the grid of said last-mentioned tube.

7. A system for testing conductive materials which includes an oscillator comprising two vacuum tubes having their cathodes connected together, a resistance connected between the grid and cathode of each tube, a condenser connected from the grid of each tube to the anode of the other tube, a test coil tuned to a testing frequency connected in the anode circuit of one of said tubes, and an untuned output impedance connected in the anode circuit of the other of said tubes.

8. A system according to claim 7 wherein said output impedance couples said oscillator to a rectifier, an indicating device being linked to said rectifier whereby to respond to fluctuations in the rectified output thereof.

9. A system according to claim 7 wherein said output impedance comprises one winding of a transformer coupling said oscillator to a rectifier, and said system includes a direct-current amplifier connected to said rectifier through a compensator, an indicating device connected to the output of said direct-current amplifier, and means for adjusting said compensator to impress on said amplifier a potential such as to adjust the setting of said indicating device.

10. A system for testing conductive material, which includes an oscillator of which the output varies in accordance with a characteristic of said material, a test coil coupled to said oscillator and adapted to be placed in inductive relation to the material under test and connected to control the output of said oscillator, a rectifier coupled to the output of said oscillator, a direct-current amplifier connected to said rectifier through a compensator, an indicating device connected to the output of said direct-current amplifier, and means for adjusting said compensator to impress on said amplifier a potential such as to adjust the setting of said indicating device.

11. A system for testing conductive material, which includes in combination, an oscillating system having a primary feedback circuit and a secondary feeedback circuit, a test coil connected in each feedback circuit, and separate means for adjusting the degree of feedback in each of said circuits.

12. A system for testing conductive material, which includes in combination, an oscillating system having a primary feedback circuit and a secondary feedback circuit, a test coil connected in each feedback circuit, an amplifier in said secondary feedback circuit, and separate means for adjusting the degree of feedback in each of said circuits.

13. A system for testing conductive material, which includes in combination, an oscillating system having primary and secondary feedback circuits, a separate test coil connected in each feedback circuit and adapted to be placed in inductive relation to the material under test, an amplifier in said secondary feedback circuit, means for adjusting the effective amplification of said amplifier, and means for adjusting the effective primary feedback.

14. A system for testing conductive material, which includes in combination, an oscillating system having primary and secondary feedback circuits, a separate test coil connected in each feedback circuit and adapted to be placed in inductive relation to the material under test, means for tuning said test coils, an amplifier in said secondary feedback circuit, means for adjusting the effective amplification of said amplifier, and means for adjusting the effective primary feedback.

15. A system for testing conductive material, which includes in combination, an oscillating system having primary and secondary feedback circuits, a separate test coil connected in each feedback circuit and adapted to be placed in inductive relation to the material under test, means for tuning said test coils, an amplifier in said secondary feedback circuit, means for adjusting the effective amplification of said amplifier, means for adjusting the effective primary feedback, a rectifier coupled to the output of said oscillating system, and means including a direct-current amplifier coupling the output of said rectifier to an indicating device.

16. A system for testing conducting material, which includes in combination, an oscillating system having a primary test coil connected in a primary feedback circuit and a secondary test coil connected in a secondary feedback circuit, said secondary coil being formed in two portions series-connected with reversed polarity and symmetrically disposed with respect to said primary coil.

17. A system for testing conducting material, which includes in combination, an oscillating system having a primary test coil connected in a primary feedback circuit and a secondary test coil connected in a secondary feedback circuit, said secondary coil being formed in two portions series-connected with reversed polarity and symmetrically disposed with respect to said primary coil, means for adjusting the primary feedback, an amplifier in said secondary feedback circuit, and means for adjusting the effective amplification of said amplifier.

18. A system for testing metallic material, which includes in combination, a coil connected in an oscillation circuit responsive to changes of impedance, said coil being adapted to be placed in inductive relation to said metallic material whereby eddy current losses may be induced in said material, a resistance connected across a second coil inductively related to said first coil and to said material, and means for adjusting said resistance to compensate said oscillation circuit for the effects of said losses.

19. A system for testing metallic material, which includes in combination, a coil connected in an oscillation circuit responsive to changes of impedance, said coil being adapted to be placed in inductive relation to said metallic material whereby eddy current losses may be induced in said material, a resistance connected across a second coil inductively related to said oscillation circuit, and means for adjusting said resistance to compensate said oscillation circuit for the effects of said losses.

20. A system for testing metallic material which includes in combination, an oscillating system having primary and secondary feedback circuits, a first and a second primary test coil connected together and to said primary circuit, a first and a second secondary test coil connected together and to said secondary circuit, a first and a second loss coil, all of said first coils being symmetrically disposed in one group and all of said second coils being symmetrically disposed in another group, said loss coils being connectable respectively to a resistance, and means for adjusting said resistance.

21. A system for testing metallic material, which includes in combination, an oscillating system having primary and secondary feedback circuits, a first and a second primary test coil series-connected in said primary circuit, a first and a second secondary test coil series-connected in said secondary circuit, said first coils comprising one coil group and said second coils comprising another coil group, and a loss coil symmetrically and inductively related to the coils of one of said coil groups and connected to an adjustable resistor, at least one of said coil groups being symmetrically formed to receive said metallic material in inductive relation.

22. A system for testing metallic sheet material, which includes in combination, an oscillating system having a primary feedback circuit and a secondary feedback circuit, first and second primary test coils series-connected in said primary circuit and first and second test coils series-connected in said secondary circuit, said first coils and said second coils being formed in two coil groups adapted to receive said sheet material therebetween, said coils being disposed so that the axes thereof are substantially parallel to the surface of said material, so that the coils in each group are not inductively coupled to each other and so that the primary coil in each group is inductively coupled to the secondary coil in the other group.

23. A system for testing metallic sheet material, which includes in combination, an oscillating system having a primary feedback circuit and a secondary feedback circuit, first and second primary test coils series-connected in said primary circuit and first and second test coils series-connected in said secondary circuit, said first coils and said second coils being formed in two coil groups adapted to receive said sheet material therebetween, said coils being disposed so that the axes thereof are substantially parallel to the surface of said material, so that the coils in each group are not inductively coupled to each other and so that the primary coil in each group is inductively coupled to the secondary coil in the other group, an auxiliary coil connected in series with said primary coils, an auxiliary coil connected in series with said secondary coils and a loss coil connected to an adjustable resistance and inductively coupled to both said auxiliary coils.

24. A system for detecting variations in metallic material in motion and of which the greatest dimension is the length, which includes in combination, an oscillator system including a test coil adapted to be in inductive relation to said material as it passes by said coil whereby the output of said oscillator varies in accordance with variations in said material, an indicating device, coupling means coupling said device to said oscillator whereby said device responds to said variations in said material, two control coils, one disposed at each side of said test coil so that said material passes first one said control coil, then said test coil and finally the other said control coil, and separate control circuits connecting said control coils to said coupling means and arranged to render said device unresponsive except when said material is in inductive relation to both of said control coils.

25. A system for detecting variations in metallic material in motion and of which the greatest dimension is the length, which includes in combination, an oscillator system having primary and secondary test coils symmetrically disposed in a group, connected respectively in primary and secondary feedback circuits and adapted to be in inductive relation to said material as it passes by said coils, an indicating device, coupling means including a direct-current amplifier coupling said device to said oscillator whereby said device responds to variations in said material, two control coils one disposed at each side of said group of test coils so that said material passes first one said control coil, then said group of test coils and finally the other said control coil, and an oscillator and a rectifier linking each of said control coils with an element of said direct-current amplifier whereby to bias said amplifier to cut-off except when said material is in inductive relation to both of said control coils.

26. A system for detecting variations in magnetic material in motion and of which the greatest dimension is the length, which includes in combination, an oscillator system having primary and secondary test coils symmetrically disposed in a group, connected respectively in primary and secondary feedback circuits and adapted to be in inductive relation to said material as it passes by said coils, a saturation coil connected to a controllable source of direct current and also adapted to be in inductive relation to said material, an indicating device, coupling means including a direct-current amplifier coupling said device to said oscillator whereby said device responds to variations in said material, two control coils one disposed at each side of said group of test coils so that said material passes first one said control coil, then said group of test coils and finally the other said control coil, and an oscillator and a rectifier linking each of said control coils with an element of said direct-current amplifier whereby to bias said amplifier to cut-off except when said material is in inductive relation to both of said control coils.

27. The method of testing magnetic material which includes the steps of establishing in an oscillator, a primary feedback current effectively controlled by a given characteristic of the material under test, establishing a secondary feedback current from the output of said oscillator to the input of said oscillator, effectively controlling said feedback by said characteristic, artificially saturating said material with a direct current field to a controlled degree, and actuating an indicating device in response to the output of said oscillator.

28. A system for testing magnetic material, which includes in combination, an oscillating system having a primary feedback circuit and a secondary feedback circuit, a test coil connected in each feedback circuit, separate means for adjusting the degree of feedback in each of said circuits, a saturation coil, a source of direct current connected to said saturation coil and means for controlling said direct current.

29. A system for testing magnetic material, which includes in combination, an oscillating system having primary and secondary feedback circuits, a separate test coil connected in each feedback circuit and adapted to be placed in inductive relation to the material under test, means for tuning said test coils, an amplifier in said secondary feedback circuit, means for adjusting the effective amplification of said amplifier, means for adjusting the effective primary feedback, a saturation coil connected to a source of direct current, means for controlling the direct current, a rectifier coupled to the output of said oscillating system, and means including a direct-current amplifier coupling the output of said rectifier to an indicating device.

30. In a testing system including an oscillator and a primary coil and two secondary coils connected thereto, the method of detecting variations in material under test which includes the steps of connecting and disposing said secondary coils in balanced opposition to each other, magnetically and symmetrically coupling said secondary coils to said primary coil, passing an oscillating current through said coils to establish a magnetic field, subjecting said material to said field whereby to establish eddy currents in said material, causing said eddy currents to unbalance the magnetic coupling between said primary and secondary coils and thereby to induce in at least one of said coils a voltage related to said eddy currents, impressing said voltage on said oscillator to modify said oscillating current, and actuating an indicator in response to the modified output of said oscillator.

31. A system for testing conducting material, which includes in combination, an oscillator for generating a testing current, and three coils connected thereto, and adapted to be placed in inductive relation to the material under test, two of said coils being connected in series with reversed polarity with respect to each other and symmetrically coupled with respect to the third coil.

32. A system for testing conducting material, which includes in combination, an oscillator and a primary coil and a secondary coil connected thereto and adapted to be placed in inductive relation to the material under test, said secondary coil being formed in two portions series-connected with reversed polarity with respect to each other and symmetrically coupled with respect to the primary coil.

33. A system for testing variations in conducting material, which includes in combination, an oscillator for generating a testing current, three coils connected thereto and adapted to be placed in inductive relation to the material under test, two of said coils being connected in series with reversed polarity with respect to each other and symmetrically coupled with respect to the third coil, whereby the presence of variations in said material modifies the oscillations of said oscillator by unbalancing the coupling relation of said coils, and a device coupled to the output of said oscillator for indicating the modifications of said oscillations.

THEODOR ZUSCHLAG.